(12) United States Patent
Bohr et al.

(10) Patent No.: US 7,373,836 B2
(45) Date of Patent: May 20, 2008

(54) VELOCITY FEEDFORWARD COMPENSATION FOR FORCE CONTROL SYSTEMS

(75) Inventors: Gerard V. Bohr, Fountain Valley, CA (US); Norman J. Englund, Seattle, WA (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 11/219,957

(22) Filed: Sep. 6, 2005

(65) Prior Publication Data

US 2007/0051181 A1 Mar. 8, 2007

(51) Int. Cl.
G01L 1/00 (2006.01)
(52) U.S. Cl. ...................................... 73/774
(58) Field of Classification Search ............... 700/245; 73/774, 840
See application file for complete search history.

(56) References Cited

U.S. PATENT DOCUMENTS 4,094,188 A * 6/1978 Bellouin et al. ............... 73/81
6,286,644 B1 * 9/2001 Wakui ......................... 188/378
6,463,357 B1 * 10/2002 An et al. ..................... 700/245
6,470,225 B1 * 10/2002 Yutkowitz .................... 700/44

OTHER PUBLICATIONS

U.S. Appl. No. 11/221,006.*

* cited by examiner

Primary Examiner—Jewel Thompson
(74) Attorney, Agent, or Firm—Ostrager Chong Flaherty & Broitman P.C.

(57) ABSTRACT

A controlled system (480) for application of force on a test object includes a force actuator (484) that is coupled to and applies a force on the test object. A velocity signal generator (482) is in a feedforward configuration relative to the force actuator (484) and generates a velocity signal (503) that is predictive of the velocity of the test object. A controller (482) is coupled to the force actuator (484) and to the velocity signal generator (482) and generates a desired applied force signal (546) compensated by the velocity signal (503).

25 Claims, 10 Drawing Sheets

VELOCITY FEEDFORWARD COMPENSATION FOR FORCE CONTROL SYSTEMS

GOVERNMENT CONTRACT

This invention was made with Government support under Contract No.F33657-81-C-2108. The Government has certain rights in this invention.

TECHNICAL FIELD

The present invention relates generally to force control systems and to vehicle and component testing systems. More particularly, the present invention is related to the accurate controlling of applied force and the direction of that force on a component or system under test.

BACKGROUND OF THE INVENTION

Vehicle systems and components are tested during the development and manufacturing thereof using various techniques. The systems and components undergo static, quasi-static, and dynamic testing to meet and exceed various durability, lifespan, and performance requirements. The testing techniques are used to simulate a working environment and to assure that the systems and/or components under test can survive and perform as desired within that environment.

In performing such tests various actuators are utilized. The actuators apply force on the systems and or components under test. It is desirable that the applied force be accurately controlled. It is also desirable that the actuators when appropriate be capable of following the motion of a device without imposing uncharacteristical forces or in effect restricting the motion of that device. For example, when testing an airfoil or wing of an aircraft tens to hundreds of actuators may be coupled to both sides of that wing. The actuators must work in unison to flex the structure and cause accelerated fatigue. Some tests require high cycle rates, which can be difficult to follow due to changing dynamics experienced by the actuators. As an example, when the wing is being flexed in an upward direction, the actuators coupled to the topside of that wing ought to follow the motion and velocity of that wing without uncharacteristically restricting its movement while the bottom side actuators are applying force in an upward direction. In other words, the non-acting or force-imposing actuators should not impose forces on the wing that would not normally be experienced in a normal operating environment.

Dynamic load control involves the accurate application of compressive and tensile forces to a moving object. When this load is applied using hydraulic actuators and servo valves with classical control methods, the resulting accuracy is typically unacceptable at maximum rated pressures and flows. There is inaccuracy in the applied force relative to the commanded force signals due to motion of the object. This inaccuracy is affected to such a degree that the motion of the object must be drastically reduced to obtain the desired force control accuracy.

Force control systems can also experience lack in symmetry in system polarity. This is especially true when utilizing single ended actuators, in which the amount of lack in symmetry is significant. The lack of symmetry can be due to differences in tubing connections, servo valves, and other components and devices.

Many force control systems, such as lag-lead type, lead-lag type, and pole-zero placement type systems, tend to increase system loop gain in order to reduce steady state error and thus compensate for the motion of the tested object. However, the increased gain only marginally reduces the error and leads to limit cycling or oscillation and instability in the force control loop. Even with the increased gain, these types of force control systems are not robust when null shifts occur in the equipment. Null shifts cause a proportionate amount of force errors to accumulate. Thus, these systems are partially uncontrolled systems and are only marginally stable and as error increases the systems become unstable and are sensitive to null shifts in the hardware.

Another method used to increase system robustness and reduce steady state error is error integration, which is successful in slower systems that do not have backlash and other non-linearities due to mechanical linkages. Backlash can be introduced from, for example, pin-slop. Although useful for static conditions, error integration can cause instability during transitions in force polarity. The integration process increases the settling time required for the actuator to apply an accurate load. This added time constraint reduces the benefit of using integral compensation on durability tests that have fast changing set point commands.

Yet another method used to reduce steady state error is referred to as damping derived from the force signal. This method tends to be slow, which results in larger errors for longer time intervals. The errors are larger due to the increased time for the damping algorithm to correct for the velocity.

Thus, there exists a need for an improved force control system and technique of applying controlled forces on an object under test without the steady state errors, increased settling time, and other associated disadvantages.

SUMMARY OF THE INVENTION

One embodiment of the present invention provides a force control system for the application of force on a test object. The system includes a force actuator that is coupled to and applies a force on the test object. A velocity signal generator is in a feedforward configuration relative to the force actuator and generates a velocity signal that is predictive of the velocity of the test object. A controller is coupled to the force actuator and to the velocity signal generator and generates a desired applied force signal which is compensated by the velocity signal.

The embodiments of the present invention provide several advantages. One such advantage is the provision of a force control system for testing of a test object that introduces velocity compensation into the generation of a force that is applied on the test object. The velocity compensation may be introduced in a feedforward configuration. The velocity compensation increases and provides accurate control of the test object without the need for integral compensation and provides increased stability in the control system. In structural testing this compensation also allows for quicker cycling of the test object since the load feedback better follows the force command.

Furthermore, another advantage provided by an embodiment of the present invention is the provision of a force control system that incorporates pressure corrected velocity compensation, which reduces control error. The pressure compensation compensates for the change in available pressure drop across a servo valve.

Yet another advantage provided by an embodiment of the present invention is the provision of a force control system with acceleration compensation. This reduces effects of inertia by compensating for the mass of the actuator linkage components.

Moreover, the present invention provides compensation in real time rather than using simply historical information, which is inadequate in a dynamic application. This real time compensation provides mathematically correct compensation magnitudes.

A similar improved quality of force control can be achieved by implementing an algorithm in a force control system that generates both a force command signal and a stroke command signal in a feedforward configuration. This too provides velocity compensation and minimizes control errors and improves performance accuracy.

The present invention itself, together with further objects and attendant advantages, will be best understood by reference to the following detailed description, taken in conjunction with the accompanying drawing.

DETAILED DESCRIPTION

In each of the following Figures, the same reference numerals are used to refer to the same components. While the present invention is described with respect to systems and methods of applying a controlled force on a test object, the present invention may be adapted for various applications and systems including: aeronautical systems, land-based vehicle systems, or other applications or systems known in the art that require servicing of a vehicle. The present invention is applicable to force control systems where the object in which a force is applied has motion relative to some inertial reference. This reference may be the same as that of the force control system. The present invention also applied to static and dynamic testing applications.

In the following description, various operating parameters and components are described for one constructed embodiment. These specific parameters and components are included as examples and are not meant to be limiting. Also, various systems and components are described these components may be implemented in hardware and/or software.

Figure 1:
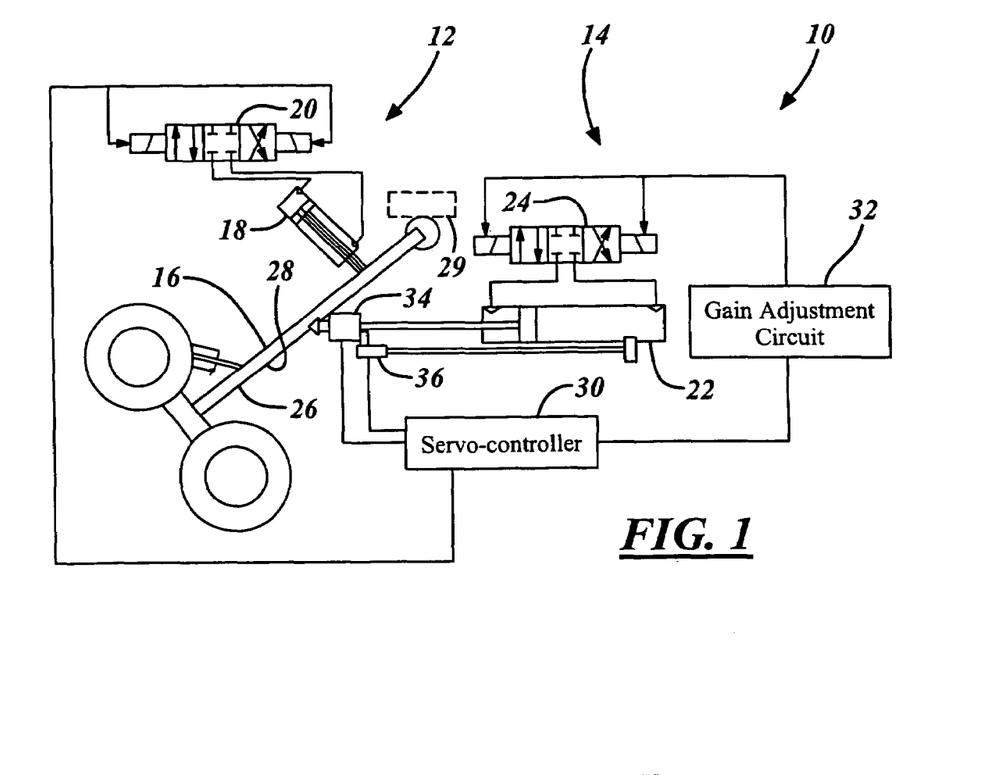
FIG. 1 is a block diagrammatic and schematic view of a portion of a force control system in accordance with an embodiment of the present invention.

Referring now to FIG. 1, a block diagrammatic and schematic view of a portion of a force control system 10 in accordance with an embodiment of the present invention is shown. The force control system 10, for the example embodiment shown, includes a deployment system 12 and an actuation system 14. The deployment system 12 includes a test object 16, a first force and/or position control actuator 18, and a first servo valve or solenoid valve 20. The actuation system 14 includes a second force actuator 22 and a second servo valve 24. The first actuator 18 is coupled to a first side 26 of the test object 16 and the second actuator 22 is coupled to a second side 28 of the test object 16. The force control system 10 may include any number of actuators on various sides of the test object 16. The force actuators may be divided up into sets and positioned on various sides and locations of the test object.

The force actuators are utilized to simulate various operating conditions of the test object 16 and/or to perform various durability, performance, lifespan, and other known testing procedures. The force actuators may sometimes be referred to as rams, cylinders, or pistons. In the example embodiment shown, the first actuator 18 is utilized to simulate the deployment and retraction of aircraft landing gear. The second actuator 22 is utilized to simulate the air drag or pressures experienced on the landing gear during landing of an associated aircraft, which in the test lab is represented by a test stand 29. When the actuation system 22 is not present, the test object 16 moves from fully deployed to fully retracted with only the force of gravity on the test object 16 and the deployment system 12. Note that during a test procedure when the simulated force, such as air pressure, is approximately zero, the second actuator 22 ought to follow the motion of the test object 16 without introducing artificial forces that would not normally be experienced.

The test object 16 may be compliant and have multiple force actuation systems acting thereon. In addition, the test object 16 may be fixed in one or more locations and the compliance may allow motion that is significantly independent of any one of the force actuation systems, i.e. there would be motion even though one of the force control systems was removed.

The first actuator 18 and the second actuator 22 are hydraulic and are driven through the use of the first servo valve 20 and the second servo valve 24, respectively. The servo valves 20 and 24 are controlled via a servo-controller 30 or the like. The hydraulic actuators 18 and 22 and valves 20 and 24 are shown for example purposes, of course, other actuators and control devices may be utilized. A gain adjustment circuit 32 is coupled between the controller 30 and the second valve 22.

A force transducer or load compensation sensor 34 is coupled between the test object 16 and the second actuator 22. A velocity compensation sensor 36 is coupled to the second actuator 22 and the load sensor 34 and detects velocity of the test object 16. The controller 30 adjusts the speed and position of the actuators 18 and 22 in response to signals received from the load sensor 34 and the velocity sensor 36. The components and devices of the force control system 10 are described in further detail below with respect to the embodiments of FIGS. 2-13. The force control system 10 is applicable to both linear and rotary force applied force systems.

Figure 2:
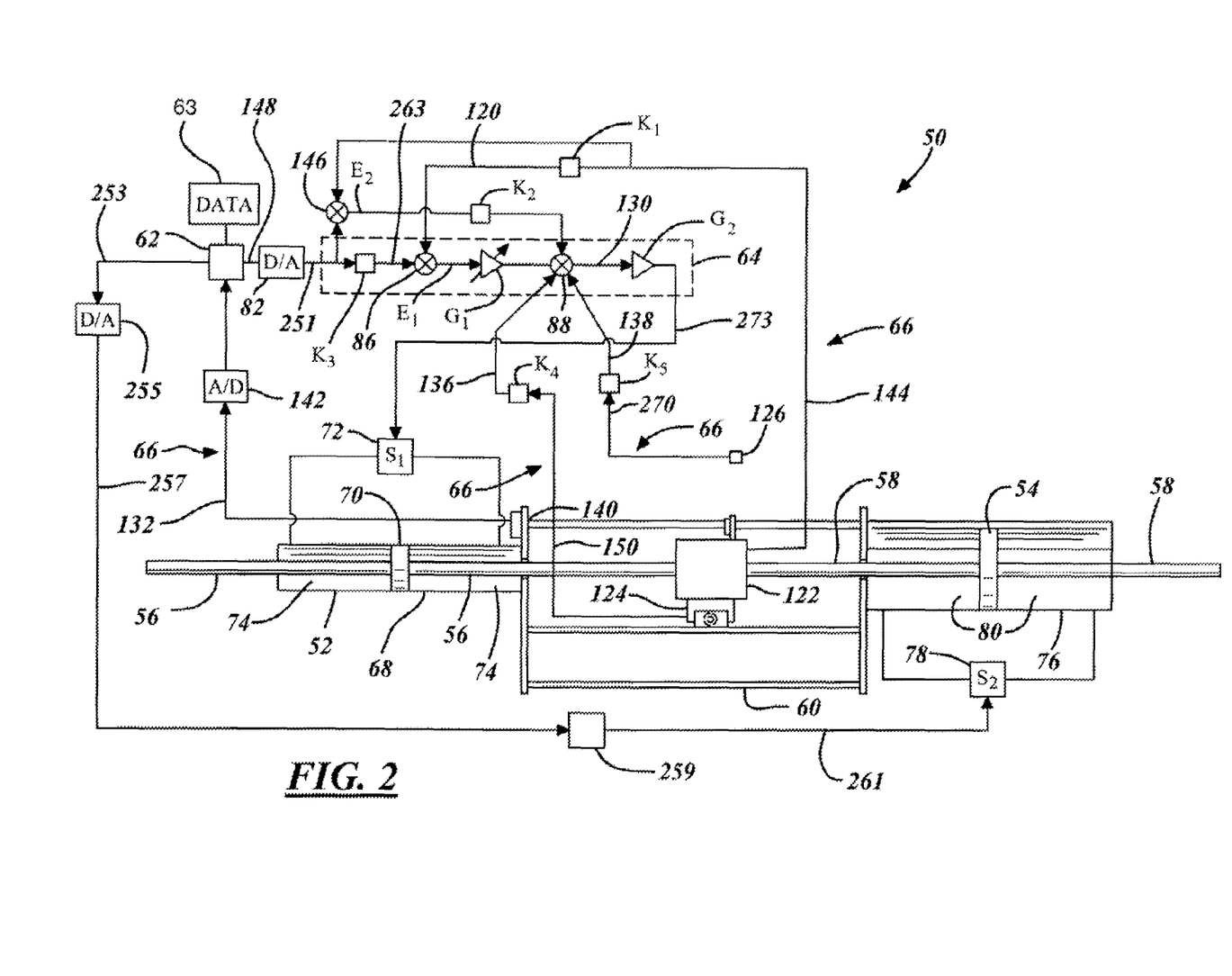
FIG. 2 is a block diagrammatic and schematic view of the force control system in accordance with an embodiment of the present invention.

Referring now to FIG. 2, a block diagrammatic and schematic view of the force control system 50 in accordance with an embodiment of the present invention is shown. The force control system 50 includes one or more force actuators and one or more test objects. In the example setup shown, a single force actuator 52 and a single test object 54 are shown. The force actuator 52 and the test object 54 are coupled to each other via an actuator shaft 56 and a test object shaft 58. The force actuator 52 and the test object 54 are held on a test stand 60. A controller 62 is coupled to the force actuator 52 and the test object 54 and controls the static and dynamic force applied on and the position of the test object 54. The control system 10 also includes one or more gain adjustment circuits 64 (only one is shown) and multiple feedback sensor configurations 66.

The force actuator 52 may be of various types and styles. A sample hydraulic force actuator is shown. The hydraulic actuator 52 includes an actuator housing 68 and an actuator piston 70 disposed therein. The position and the rate of change in position of the actuator piston 70 is adjusted by the controller 62 via a first servo valve 72. Operation of the valve 72 controls the flow of hydraulic fluid to and from for and aft sides 74 of the actuator piston 70 within the actuator housing 68.

The test object 54 may be of various types and styles. A test object 54 may, for example, be an airfoil, a door, a body panel, or other test object known in the art. A sample test object is shown. The test object shown is in the form of a hydraulic piston, hereinafter referred to as an "object piston", that is located within an object housing 76. The force applied on the object piston 54 is based on a force applied from the actuator 52. The position and rate of change in position of the object piston 54 is adjusted by the controller 62 via the second servo valve 78. Operation of the second valve 78 controls the flow of hydraulic fluid to and from for and aft sides 80 of the object piston 54 within the object housing 76.

The controller 62 may be microprocessor based such as a computer having a central processing unit, memory (RAM and/or ROM), and associated input and output buses. The controller 62 may be an application-specific integrated circuit or may be formed of other logic devices known in the art. The controller 62 may be a portion of a central control unit, an interactive vehicle dynamics module, or be combined into a single integrated controller, or may be a stand-alone controller as shown.

The controller 62 may include or be coupled to a memory 64, as shown. The memory 64 may have stored testing data and related information for performing a predetermined test. The controller 62 may have tables, parameter relationships, and other tools needed to accurately control and perform a given test.

The gain adjustment circuit 64 is coupled to the controller 62 via a digital to analog (D/A) converter 82. The gain adjustment circuit 64 includes an integration circuit $K_3$, a first summing junction 86, a first gain block $G_1$, a second summing junction 88, and a second gain block or actuator servo driver $G_2$, which are coupled in series as stated.

Figure 3:
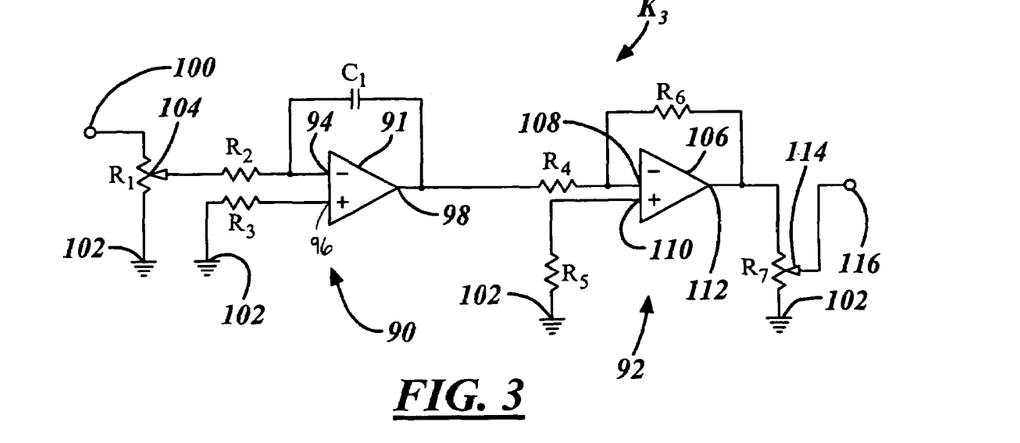
FIG. 3 is a schematic diagram of an integration circuit in accordance with an embodiment of the present invention.

Referring now also to FIG. 3, a schematic diagram of the integration circuit $K_3$ in accordance with an embodiment of the present invention is shown. The integration circuit $K_3$ includes an integration stage 90 and an amplification stage 92. The integration stage 90 includes a fist operational amplifier 91 having an inverting input 94, a non-inverting input 96, and an output 98. The input 100 of the integration circuit $K_3$ and of the integration stage 90 is coupled to a first resistor $R_1$, which is in turn coupled to a ground 102. The first resistor $R_1$ may be a variable resistor as shown. The wiper terminal 104 of the variable resistor $R_1$ is coupled to the inverting input 94 via a second resistor $R_2$. A third resistor $R_3$ is coupled between the non-inverting input 96 and ground 102. A first capacitor $C_1$ is coupled across the first amplifier 91 between the inverting input 94 and the first amplifier output 98.

The amplification stage 92 includes a second operational amplifier 106 that has an inverting input 108, a non-inverting input 110, and an output 112. A fourth resistor $R_4$ is coupled to the output 112 of the integration stage 92 and to the inverting input 108. A fifth resistor $R_5$ is coupled between the non-inverting input 110 and ground 102. A sixth resistor $R_6$ is coupled across the second amplifier 106 between the inverting input 108 and the second amplifier output 112. A seventh resistor $R_7$, which is shown as a variable resistor, is coupled between the second amplifier output 112 and ground 102. The wiper terminal 114 of the seventh resistor $R_7$, in the example embodiment shown, is also the output 116 of the amplification stage 92 and the integration circuit $K_3$.

The first summing junction 86 sums a feedback signal 120 received from a load sensor 122 with the output 116 to generate a first error signal $E_1$. The gain block $G_1$ adjusts amplification of the first error signal $E_1$. The second summing junction 88 sums feedback signals from a velocity sensor 124 and an acceleration sensor 126 and a second error signal $E_2$ to generate a desired applied force signal 130. The velocity sensor 124 may be considered a velocity signal generator. The actuator servo driver $G_2$ adjusts the gain of the desired applied force signal 130.

The feedback sensor configurations 66 generate a position compensation signal 132, the load compensation signal 120, a velocity compensation signal 136, and an acceleration compensation signal 138. The position feedback 132 includes a test object position sensor 140 that is coupled to the test object, which in continuing from the above example is the object piston 54. The position signal 132 is feedback to the controller 62 through an analog-to-digital (A/D) converter 142.

The load sensor 122 is coupled between the force actuator 52 and the object piston 54. The load signal 144 generated from the load sensor 122 is feedback to the gain adjustment circuit 64. The load signal 144 is feedback to an amplification block $K_1$ and subsequently to the first summing junction 86. The amplification block K1 includes amplification and balancing adjustment circuitry. The load signal 144 is also feedback to a third summing junction 146 where it is summed with a load or force command signal 148 to form the true error signal $E_2$. The true error signal E2 passes through a second amplification block $K_2$ prior to being received by the second summing block 88.

Figure 4:
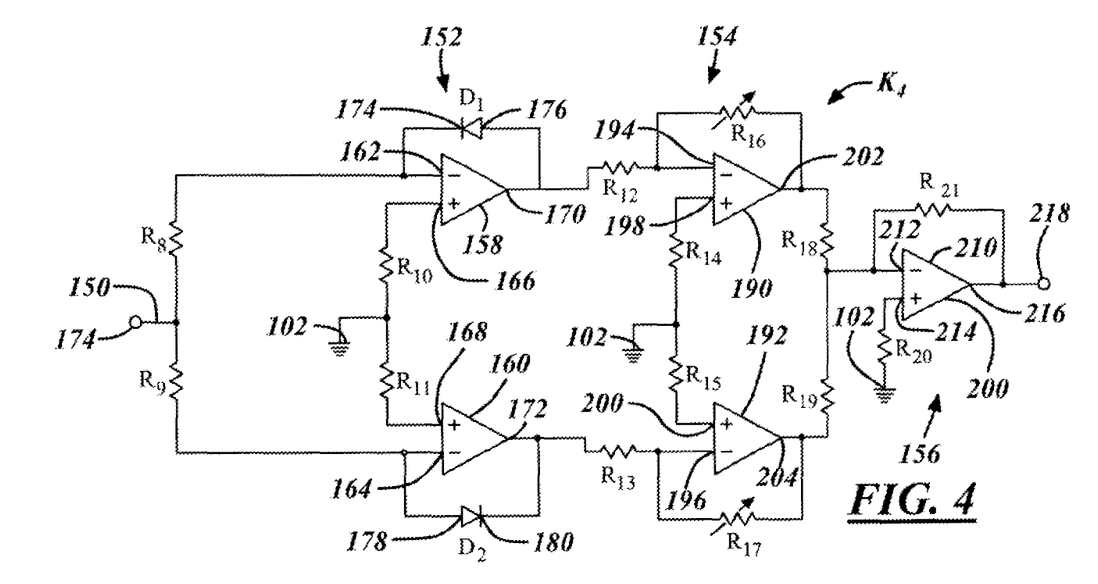
FIG. 4 is a schematic diagram of a velocity gain adjustment circuit in accordance with an embodiment of the present invention.

Referring now also to FIG. 4, a schematic diagram of the velocity gain adjustment circuit $K_4$ in accordance with an embodiment of the present invention is shown. The velocity signal 150 generated by the velocity sensor 124 is feedback to the second summing block 88 through a velocity-conditioning block $K_4$. The velocity-conditioning block $K_4$ includes a rectification stage 152, an inversion stage 154, and a combining stage 156. The rectification stage 152 includes a third operational amplifier 158 and a fourth operational amplifier 160, which have inverting inputs 162, 164, non-inverting inputs 166, 168, and outputs 170, 172, respectively. The velocity signal 150 enters the conditioning block input 174 and is separated into positive and negative components, which are rectified. The input 174 is coupled to the resistors $R_8$ and $R_9$. The resistor $R_8$ is coupled to the inverting input 162. The resistor $R_9$ is coupled to the inverting input 164. The non-inverting inputs 166, 168 are coupled to resistors $R_{10}$ and $R_{11}$, respectively, which in turn are coupled to ground 102. A first diode $D_1$ having a cathode terminal 174 and an anode terminal 176 is coupled across the third amplifier 158. The cathode terminal 174 is coupled to the inverting terminal 162. The anode terminal 176 is coupled to the third output 170. A second diode $D_2$ that has a second anode terminal 178 and a second cathode terminal 180 is coupled across the fourth amplifier 160. The second anode terminal 178 is coupled to the inverting input 164 and the second cathode terminal 180 is coupled to the fourth output 172.

The inversion stage 154 includes a fifth operational amplifier 190 and a sixth operational amplifier 192, which have inverting inputs 194, 196, non-inverting inputs 198, 200 and outputs 202, 204, respectively. Resistor $R_{12}$ is coupled between the third output 170 and the inverting input 194. Resistor $R_{13}$ is coupled between the fourth output 172 and the inverting input 196. Resistors $R_{14}$ and $R_{15}$ are coupled between the non-inverting inputs 194, 196, respectively, and ground 102. The variable resistor $R_{16}$ is coupled across the fifth amplifier 190 between the inverting input 194 and the fifth output 202. The variable resistor $R_{17}$ is coupled across the sixth amplifier 192 between the inverting input 196 and the sixth output 204.

The combining stage 156 includes a seventh operational amplifier 210 having an inverting input 212, a non-inverting input 214, and an output 216. Resistor $R_{18}$ is coupled between the fifth output 202 and the inverting input 212. Resistor $R_{19}$ is coupled between the sixth output 204 and the inverting input 212. Resistor $R_{20}$ is coupled between the non-inverting input 214 and, ground 102. Resistor $R_{21}$ is coupled across the seventh amplifier 200 between the inverting input 212 and the seventh output or the output 218 of the velocity-conditioning block $K_4$, which may be referred to as a polarity compensator.

The acceleration signal 220 generated by the acceleration sensor 126 is feedback to the second summing junction 88 through an acceleration-conditioning block $K_5$. The acceleration-conditioning block KS includes excitation, amplification, and balance adjustment circuitry known in the art that is commonly utilized with respect to acceleration sensors.

The load sensor 122, the velocity sensor 124, the acceleration sensor 126, and the position sensor 140 may be of various types and styles known in the art. Some examples of load sensors are, load cells, strain gages, piezoresistive sensors, and other known force sensors. Some examples of velocity sensors are Hall effect sensors, pitot tube arrays, position sensors that provide actual velocity information, and pressure sensors. Some example acceleration sensors are accelerometers, infrared sensors, laser sensors, and ultrasonic sensors. Some examples of position sensors are infrared sensors, linear and rotary potentiometers, ultrasonic sensors, and magnetic sensors.

Figures 5A, 5B:
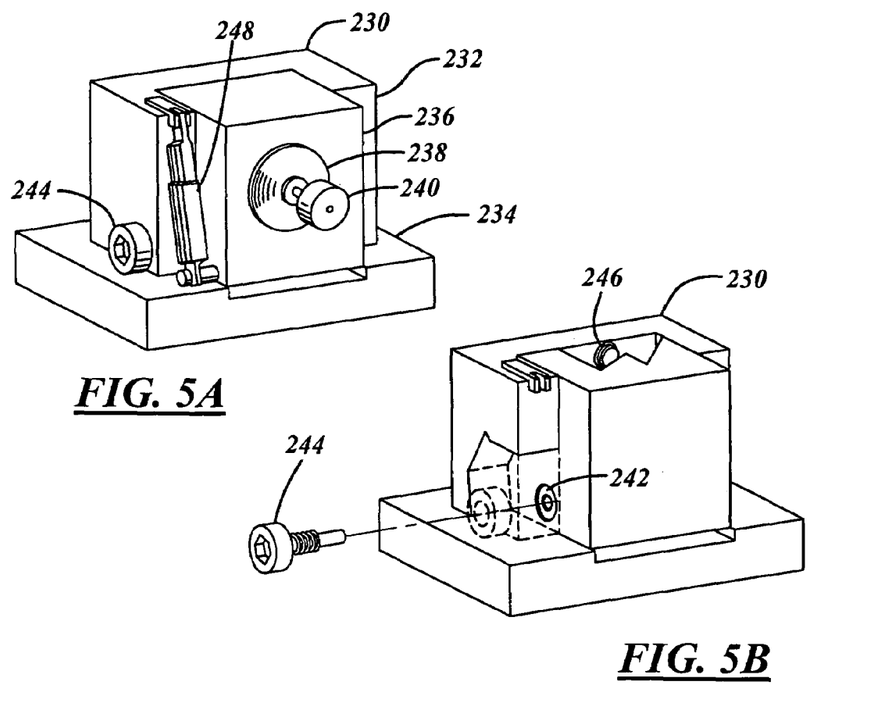
FIG. 5A is a front perspective view of a sample velocity transducer assembly in accordance with an embodiment of the present invention.
FIG. 5B is a back perspective view of the velocity transducer assembly of FIG. 5A.

Referring now also to FIGS. 5A and 5B, front and back perspective views of a sample velocity transducer assembly 230 in accordance with an embodiment of the present invention is shown. The velocity transducer assembly 230 may be used in place of the velocity sensor 124. The velocity transducer assembly 230 includes fixed backing member 232 that is mounted on a base 234. A transducer housing 236 is coupled to the backing member 232 and to the base 234. A transducer 238 is disposed within the housing 236 and may be coupled to the test object shaft 58 via a rotatable wheel 240. The transducer 238 has an output that is proportional to velocity and is rated in volts per revolutions per minute (RPM). The wheel 240 is utilized to convert linear motion into rotational motion. Of course, other coupling methods between the transducer 238 and the object piston 54 may be utilized.

The housing 236 is coupled on each side thereof to a bearing 242, which is secured by a threaded step shaft 244. The bearing 242 allows the wheel 240 to pivot up and down accommodating irregularities in the surface on which it rolls. A spring 246 is incorporated between the backing member 232 and the housing 236 to maintain contact between the wheel 240 and the object piston 54. The spring 246 provides the proper amount of contact force. A damper 248, which may be fluidic, is coupled between the backing member 232 and the housing 236 and prevents the velocity transducer 238 from oscillating.

Figure 6:
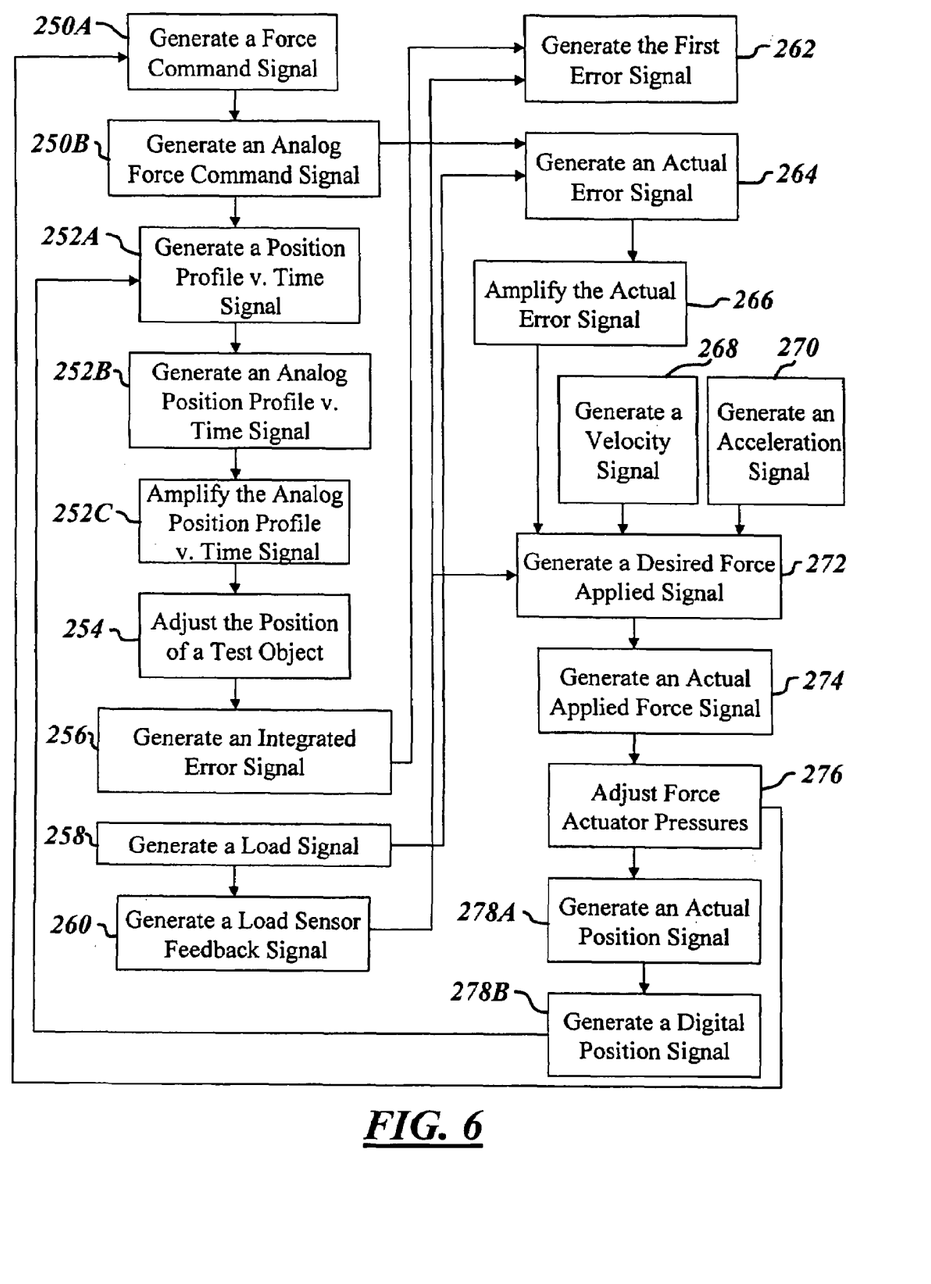
FIG. 6 is a logic control diagram illustrating a method of operating a force control system in accordance with an embodiment of the present invention.

Referring now to FIG. 6, a logic control diagram illustrating a method of operating a force control system and/or of applying a force on a test object in accordance with an embodiment of the present invention is shown. Although the following steps 250-278 are described primarily with respect to the embodiment of FIG. 2, the steps and associated method may be applied to other embodiments of the present invention.

In step 250A, the controller 62 generates a force command signal 148 in response to the actual position signal 132, generated in step 278 below. In step 250B, the first D/A converter 82 converts the force command signal 148 into an analog force command signal 251.

In step 252A, the controller 62 generates a position profile versus time signal 253. In step 252B, the second D/A converter 255 converts the position profile signal 253 into an analog position profile signal 257. In step 252C, the analog position profile signal 257 is amplified via the valve amplifier 259 to form an amplified position profile signal 261. In step 254, the position of the test object is adjusted in response to the amplified position profile signal 261.

In step 256, the analog command signal 251 is received by a gain adjustment circuit and is passed to the integration circuit $K_3$. The integration circuit $K_3$ adjusts the gain of the analog command signal 251 and generates an integrated error signal 263.

In step 258, the load sensor 122 generates the load signal 144. In step 260, the load signal 144 is amplified by the amplification block $K_1$ to form the load sensor feedback signal 120. In step 262, the integrated error signal 263 is summed with the load sensor feedback signal 120 to generate the first error signal $E_1$. In step 264, the load signal 144 is summed with the analog command signal 251 to form the true or actual error signal $E_2$. In step 266, the actual error signal $E_2$ is amplified by the amplification block $K_2$.

In step 268, the velocity sensor 124 generates the velocity signal. In step 270, the acceleration sensor 126 generates the acceleration signal.

In step 272, the first error signal $E_1$ is amplified by the gain block $G_1$ and is summed with the velocity compensation signal 136, the acceleration compensation signal 138, and the actual error signal $E_2$ to form the desired applied force signal 130. In step 274, the gain of the desired applied force signal 130 is adjusted by the second gain block $G_2$ to form the actual applied force signal 273. In step 276, the actuator valve 72 receives the actual applied force signal 273 and adjusts pressures within the force actuator 52 in response thereto.

In step 278A, the position sensor 140 generates the actual position signal 132 indicative of the position of the object piston 54. In step 278B, the position signal 132 is converted to a digital signal.

Steps 250-278 are continuously repeated until the end of a test procedure. The above-described steps are meant to be illustrative examples; the steps may be performed sequentially, synchronously, simultaneously, or in a different order depending upon the application.

Figure 7:
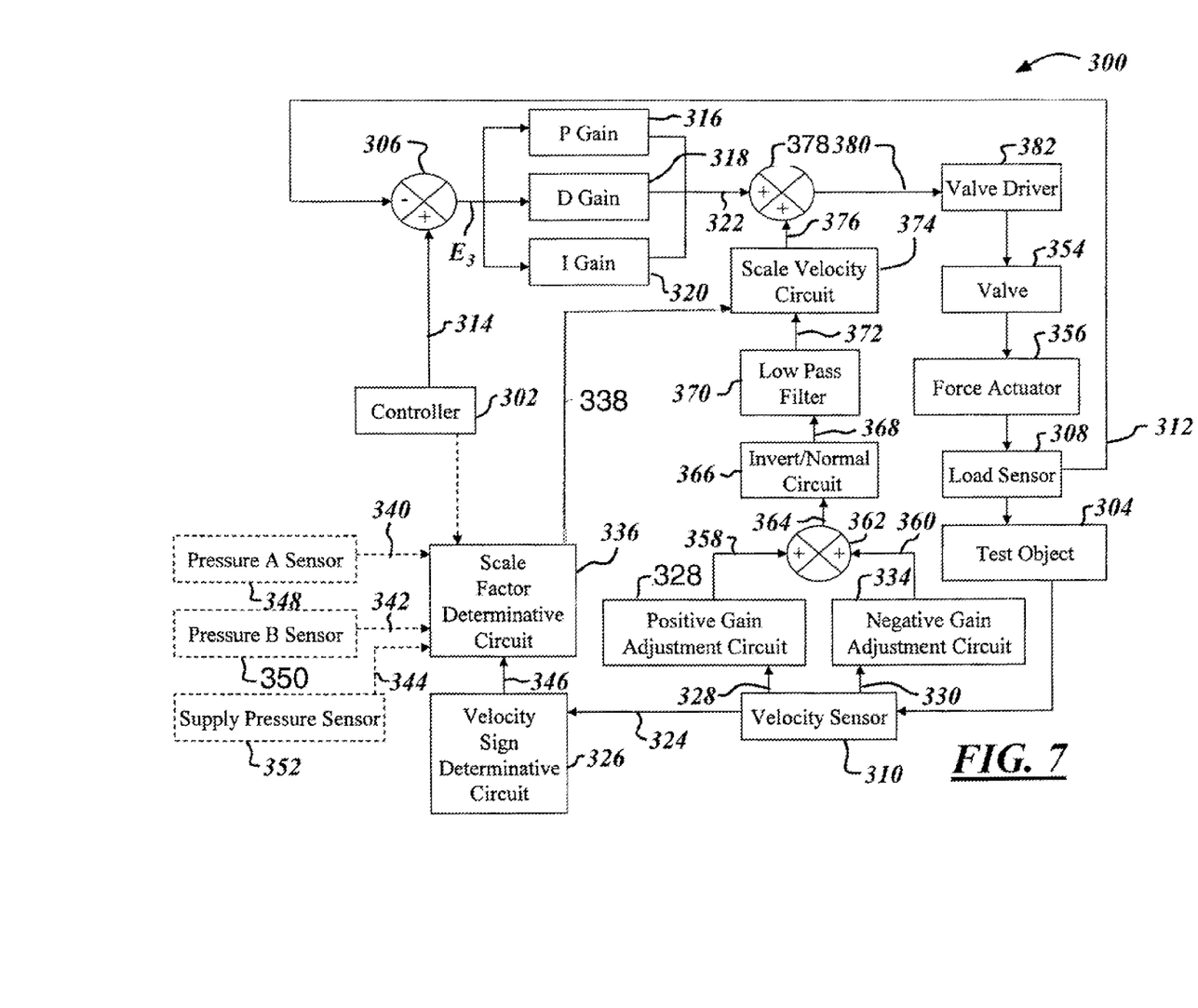
FIG. 7 is a block diagrammatic and schematic view of a force control system in accordance with another embodiment of the present invention.

Referring now to FIG. 7, a block diagrammatic and schematic view of a force control system 300 in accordance with another embodiment of the present invention is shown. The force control system 300 includes a controller 302 and a test object 304. The controller 302 is similar to the controller 62 and is coupled to a forth summing junction 306. The test object 304 is coupled to a load sensor 308 and a velocity sensor 310. The load sensor 308 is also coupled to the forth junction 306. A load signal 312 from the load sensor 308 is subtracted from a force command signal 314 from the controller 302 via the forth junction 306 to form an error signal $E_3$. The error signal $E_3$ is gain adjusted via a proportional gain adjustment circuit 316, a derivative gain adjustment circuit 318, and an integral gain adjustment circuit 320 to form a modified command signal 322.

The velocity sensor 310 generates a velocity signal 324 that is sent to a velocity sign determinative circuit 326 and is separated into a positive portion 328 and a negative portion 330. The portions 328 and 330 are adjusted via a positive gain adjustment circuit 332 and a negative gain adjustment circuit 334, respectively. The velocity sensor 310 may have a velocity signal offset adjustment (not shown). The velocity compensation is applied to compensate for the polarity, amplitude, and offset of the velocity signal.

When a force actuator of a force control system is driven using hydraulic fluid power and is controlled via a servo valve, as described herein, there may be a loss of force command accuracy. The loss is associated with fluctuations in the available supply pressure, or supply pressure drops, for the velocity compensation in the servo valve. Pressure inaccuracies may also result from the use of large amounts of available pressure to produce the forces that are commanded. Thus, there may be a need to correct for the change in the pressure available for velocity compensation in the servo valve.

Output from the sign determinative circuit 326 is passed to a scale factor determinative circuit 336. The scale factor determinative circuit 336 generates a pressure scale factor 338 in response to force actuator pressures 340 and 342, supply pressure 344, and sign of the velocity signal 346. The pressure scale factor 338 is described in further detail below with respect to expression 5.

The force actuator pressures 340 and 342 and the supply pressure 344 may be generated via a port A pressure sensor 348, a port B pressure sensor 350, and an input pressure sensor 352, or may be calculated by the controller 302. The controller 302 may have stored data relating commanded forces for a given application, fuel control system specifications, fluid circuit specifications, valve specifications, force actuator specifications, as well as other specifications to pressures within and supplied to the valve 354 and force actuator 356.

The gain adjusted positive and negative portions 358 and 360 of the velocity signal are summed via a fifth summing junction 362 to form a combined signal 364. The gain adjustment of the positive and negative portions 358 and 360 provides the proper velocity compensation value and enables the velocity compensation for the inherent lack of symmetry from single ended actuators and other sources.

The combined signal 364 is inverted by an invert/normal circuit 366, since there is no standard predefined polarity for the velocity. The inverted signal 368 is then filtered through a low pass filter 370. The low pass filter 370 may be set just below the natural frequency of the force control system 300 to reduce the tendency for oscillation due to the velocity input. The filtered signal 372 is scaled using a scale velocity circuit 374. The scaling circuit 374 scales the filtered signal 372 by the pressure scale factor 338 determined above. The force control system 300 may also have the ability to enable and disable the velocity compensation and/or the pressure compensation.

Note that the scaled filtered signal 376 is feedback into the control loop following the proportional, integral, and derivative gain adjustments. This prevents the affect of the gain adjustments on the velocity compensation.

With simple or traditional closed loop control when the error is zero, the output of the controller is zero. Since a typical servo valve is closed at zero input there has to be error for the valve to be open. The larger the velocity, the more error is developed to open the valve. The present invention overcomes this by biasing the servo valve open, in an amount that is proportional to the velocity. Thus, the valve can be open without introducing error into the force control loop, to allow for the movement of the test object.

The use of the filter limits instability due to the addition of the velocity compensation. The filter is adjustable and is specific to the velocity compensation.

The scaled filtered signal 376 is summed with the modified command signal 322 via a sixth summing junction 378 to form a desired applied force signal 380. The desired applied force signal is conditioned for valve control via a valve driver 382.

The following FIGS. 8-13 provide a further detailed explanation for the reasoning for velocity and pressure compensation.

Figure 8:
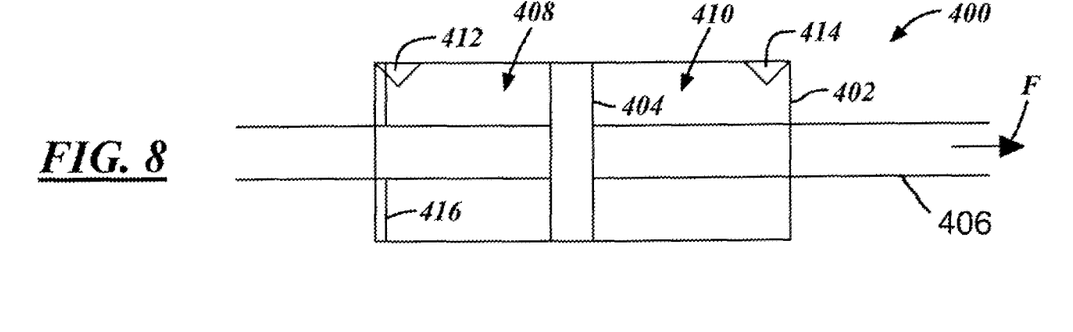
FIG. 8 is a side cross-sectional view of a force actuator in accordance with an embodiment of the present invention.

Referring now to FIG. 8, a side cross-sectional view of a force actuator 400 in accordance with an embodiment of the present invention is shown. The force actuator 400 includes a housing 402 with a piston 404 disposed and translational therein on a shaft 406. The housing 402 is divided internally by the piston 404 to form a first side 408 and a second side 410. The first side 408 and the second side 410 have a first port 412 and a second port 414, respectively, having pressures PA and PB. A predetermined or incremental amount of fluid 416 is added into the force actuator 400 on the first side 408. Force F generated by the addition of the fluid 416 is equal to the pressure P in the first side 408 multiplied by the cross-sectional area A of the piston 404. Expression 1 provides the pressure P, where $\beta_e$ is the effective bulk modulus, V is the volume on the first side 408, and Q is the fluid flow rate.

$$P = \frac{\beta_e}{V} \int Q dt \quad [1]$$

When the associated test object has compliance and moves, the incremental quantity of fluid injected into the actuator 400 may be increased until the stiffness of the test object balances the desired force output by the actuator 400.

Figure 9:
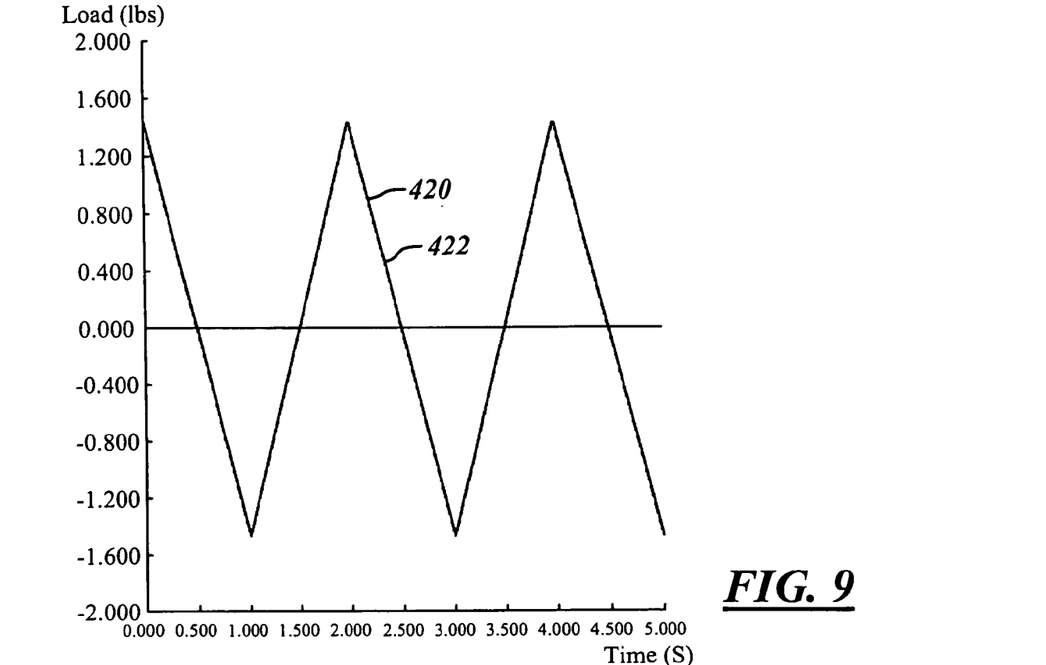
FIG. 9 is a sample plot of a force on a stationary object.

Referring now to FIG. 9, a sample plot of a force on a stationary object is shown. A triangular force profile is shown for a test object having a small amount of compliance. Although in FIG. 9 it appears that a single curve is shown, in actuality two curves are present a force command curve 420 and an actual force curve 422. The error between the force command curve 420 and the actual force curve 422 is so small that it appears as though a single curve is shown.

Figure 10:
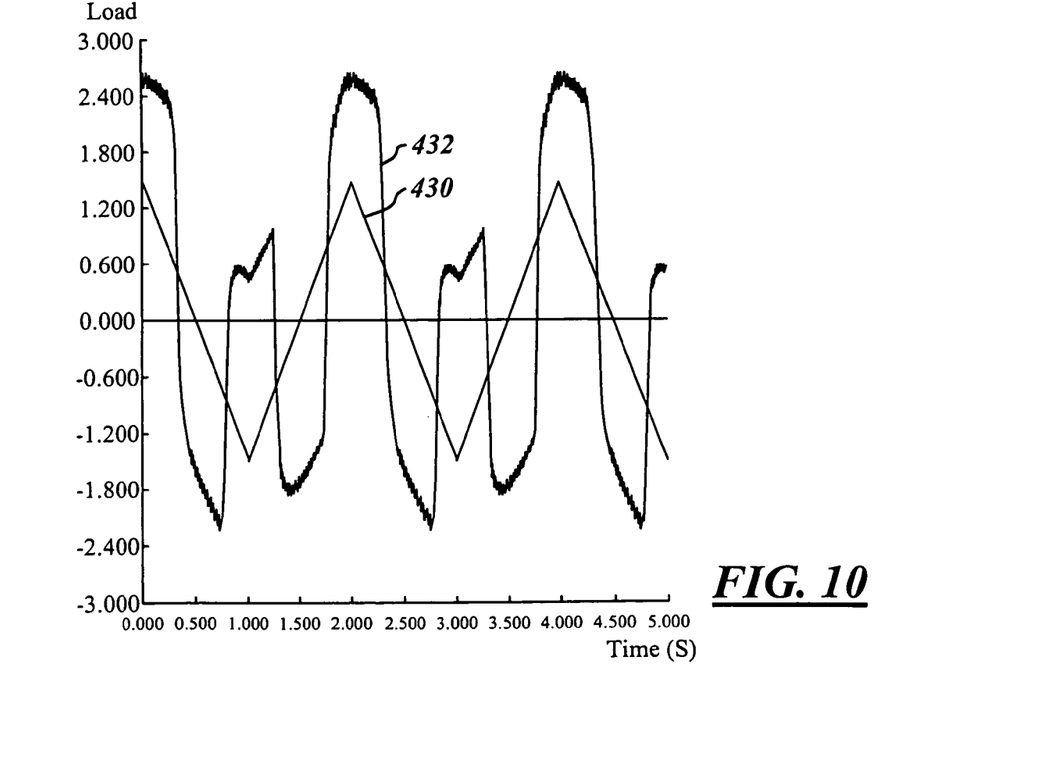
FIG. 10 is a sample plot comparing a force command signal with an actual force on an object in motion.

Referring now to FIG. 10, a sample plot comparing a force command signal 430 with an actual force signal 432 on an object in motion is shown. When the object that the force is applied on is moving, expression 1 is no longer adequate. The object is set in an oscillatory motion. Notice that the actual force signal 432 does not follow the force command signal 430. Expressions 2 and 3 also need to be satisfied in order for the control system to follow the velocity of the object.

$$Q = A * Vel \quad [2]$$

$$Q = K_v i \quad [3]$$

Vel is the velocity of the object, which is proportional to the valve electrical current if the desired force remains constant. The velocity is proportional or directly related to the valve current. This proportionality is linear when the programmed force is constant. $K_v$ is the valve constant and i is the valve current. Expressions 2 and 3 satisfy the flow rate required for the actuator to match the velocity of the object with no net force. When expressions 2 and 3 are both satisfied, the actuator is following the motion of the object without applying force on the object.

Figure 11:
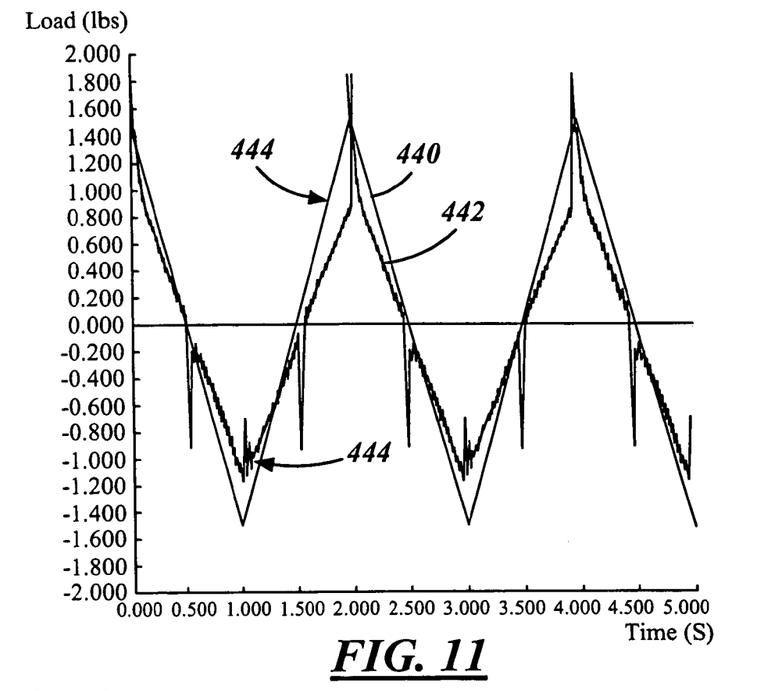
FIG. 11 is a sample plot comparing a force command signal with an actual force on a test object in motion using velocity compensation in accordance with an embodiment of the present invention.

Referring now to FIG. 11, a plot comparing a force command signal 440 with an actual force signal 442 on a test object in motion using velocity compensation in accordance with an embodiment of the present invention is shown. The actual force signal 442 follows the force command signal 440 much closer than that of FIG. 10 when velocity compensation is not used. Notice that the actual force has "drooping" areas 444 in comparison to the force command signal 440. The drooping areas are due to the force that is being created. The pressure available to provide the velocity compensation is decreased. Thus, pressure compensation or force correction is used to overcome this drooping effect.

Expression 2 and 3 provide the velocity compensation that is used when there is a constant specified pressure drop across the actuator valve. When this pressure drop varies, the current to produce the flow rate varies with the square root of the pressure drop. This is derived from the orifice expression 4, which is a non-linear function of the pressure drop across the orifice of the actuator valve.

$$Q = C_d A_d \sqrt{\frac{2}{\rho}(P_S - P_R)} \quad [4]$$

$C_d$ is the discharge coefficient, $A_d$ is the area of the orifice, $P_S$ is the supply pressure, and $P_R$ is the return pressure. $P_R$ is equal to the absolute value of the first port pressure $P_A$ minus the second port pressure $P_B$. $\rho$ is the density of the fluid 416.

For simplicity return pressure $P_R$ may be assumed to be zero. The pressure scale factor is introduced for the amount the velocity compensation current $i_1$, which is set with zero force from the actuator, i.e. the first port pressure $P_A$ is equal to the second port pressure $P_B$, is to be scaled to compensate for the force and the available pressure. The resultant current is referred to as current $i_2$, as shown in expression 5, where $$\frac{\sqrt{P_1}}{\sqrt{P_2}}$$

is the pressure scale factor, $P_1$ is equal to the supply pressure available at zero load when the velocity compensation is adjusted, and $P_2$ is shown by expression 6.

$$i_2 = i_1 * \frac{\sqrt{P_1}}{\sqrt{P_2}} \quad [5]$$

$$P_2 = P_S - |P_A - P_B| * (\text{sign of the velocity}) \quad [6]$$

There are four states in dynamic load control of an object with independent motion. State 1 and state 2 refer to when the force applied is aiding the velocity compensation. In state 1 and state 2 the velocity compensation is directed in the opposite direction as the force or $P_2 = P_S + |P_A - P_B|$. State 1 refers to when the velocity compensation is positive and the force is negative, in other words, $P_A < P_B$ and $P_{Avail} = P_A - P_B$, which is negative. State 2 refers to when the velocity compensation is negative and the force is positive, in other words, $P_A > P_B$ and $P_{Avail}$ which is positive.

State 3 and state 4 refer to when the force applied subtracts from the velocity compensation. In state 3 and state 4 the velocity compensation is directed in the same direction as the force or $P_2 = P_S - |P_A - P_B|$. State 3 refers to when the force applied and the velocity compensation is positive, in other words, $P_A > P_B$ and $P_{Avail}$ is positive. State 4 refers to when the force applied and the velocity compensation are negative, in other words, $P_A < P_B$ and $P_{Avail}$ is negative.

Figure 12:
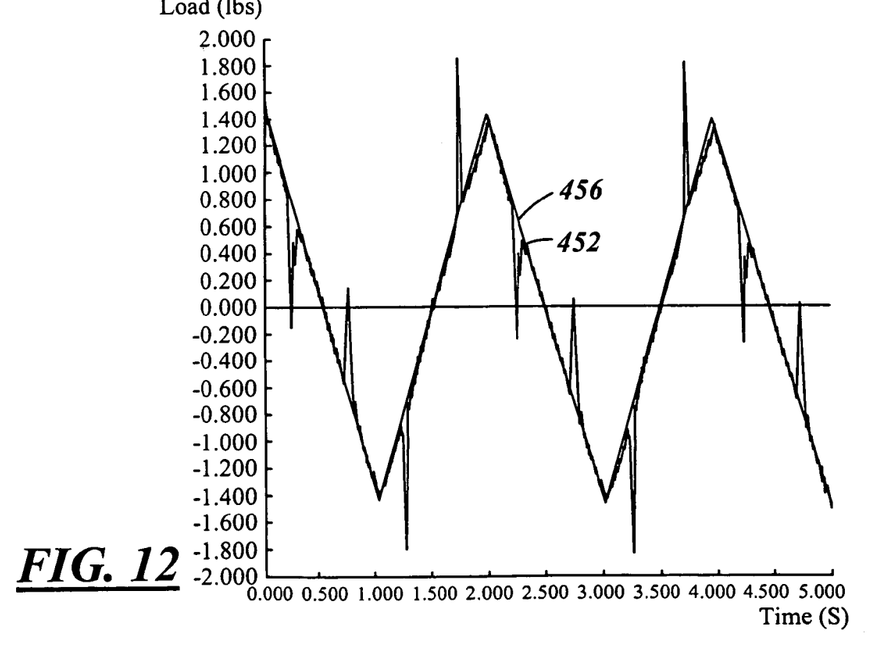
FIG. 12 is a sample plot comparing a force command with an actual force on a test object using velocity and pressure compensation in accordance with an embodiment of the present invention.

The introduction of the pressure scale factor into the control loop reduces error or eliminates the drooping effect shown in FIG. 11. This is shown in FIG. 12. In FIG. 12, a plot comparing a force command signal 450 with an actual force signal 452 on a test object using velocity and pressure compensation in accordance with an embodiment of the present invention is shown.

Figure 13:
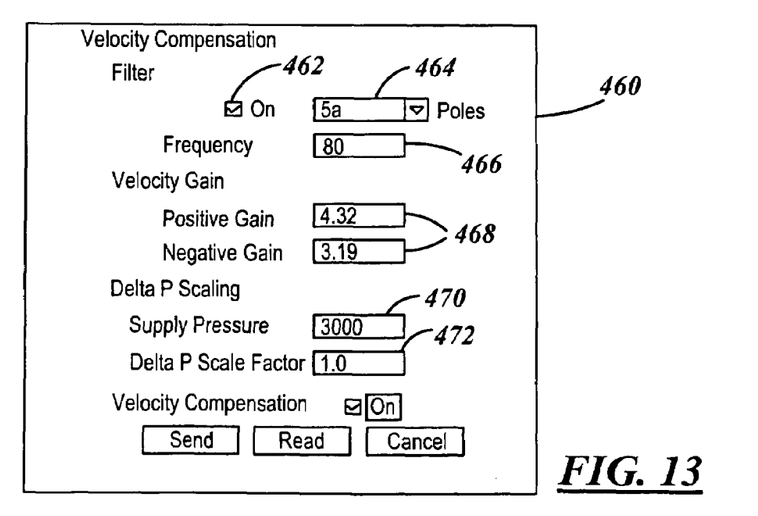
FIG. 13 is a front view of a velocity compensation interface in accordance with an embodiment of the present invention.

Referring now to FIG. 7 and to FIG. 13, in which a front view of a velocity compensation interface 460 in accordance with an embodiment of the present invention is shown. A majority of the devices of the force control system 300, shown in FIG. 7, may be implemented in both software and hardware. The software may contain various algorithms for performing the stated and associated tasks. The software may be operated via a controller and have software based inputs with a user interface. The interface 460 shown is an example of a software implementation. The interface 460 includes a filter enablement box 462, a number of poles input 464 for the filter, and a cutoff frequency input 466 for the filter. Positive and negative gain adjustment inputs 468 are also provided. The associated software may determine the sign of the velocity signal and scale the positive and negative portions thereof by the positive and negative gain input values. This software code may take the place of or be used instead of the polarity compensator $K_4$ above.

The interface 460 also includes a delta P scaling section, which has a supply pressure input 470 and a delta P scale factor input 472. The supply pressure input 470 is a constant value. The actual real time supply pressure value may be read by the algorithm, instead of using the constant value 470, and thereby compensate for droop and irregularities in the supply pressure to the load control servovalve. The delta P scale factor 472 is used to adjust the effectiveness of the pressure compensation. The delta P scale factor 472 may be multiplied by the pressure scale factor 338 to increase or reduce the amount of pressure compensation.

The forces applied in moving test objects are often non-linear functions of another variable, such as landing gear angle. The present invention in compensating for the velocity and the acceleration of the test object and the pressures associated with the force actuator valve applies an accurate force profile to the test object. The velocity compensation results in a more stable system, and this is especially realized when multiple force systems are installed on a single test object. This is because of the loop gain of the force control system, which may be reduced as much as 90%, since it does not have to compensate for the motion of the object and only has to provide closed loop control of the force.

The present invention also provides a means to apply a force to a moving object when the motion is not a dependent function of the applied force. The present invention provides an accurate force even when there are fluctuations in supply pressure or lack of available pressure across a servo valve delivering hydraulic power to the force producing device.

Figure 14:
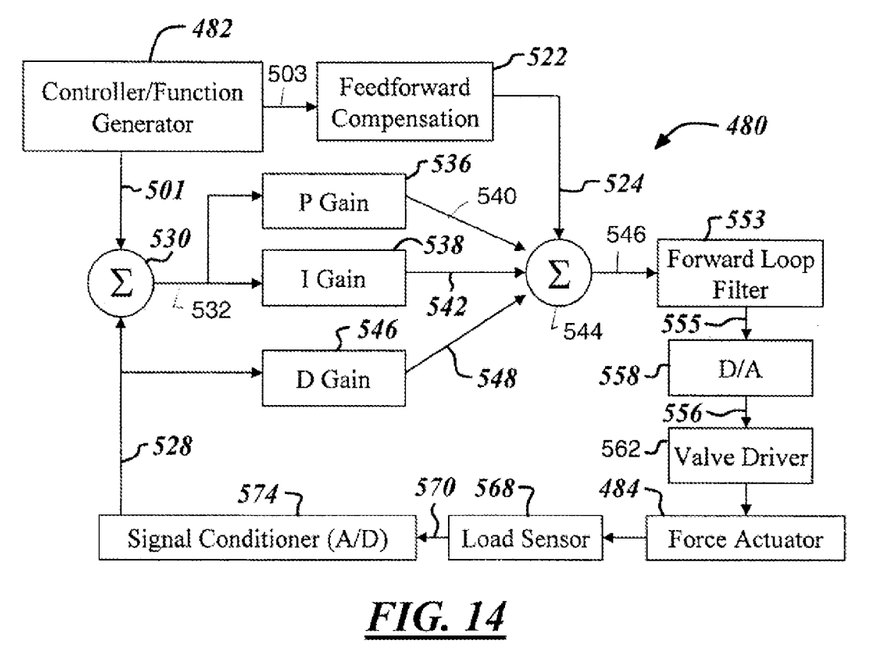
FIG. 14 is a block diagrammatic view of force control system in accordance with yet another embodiment of the present invention.
Figure 15:
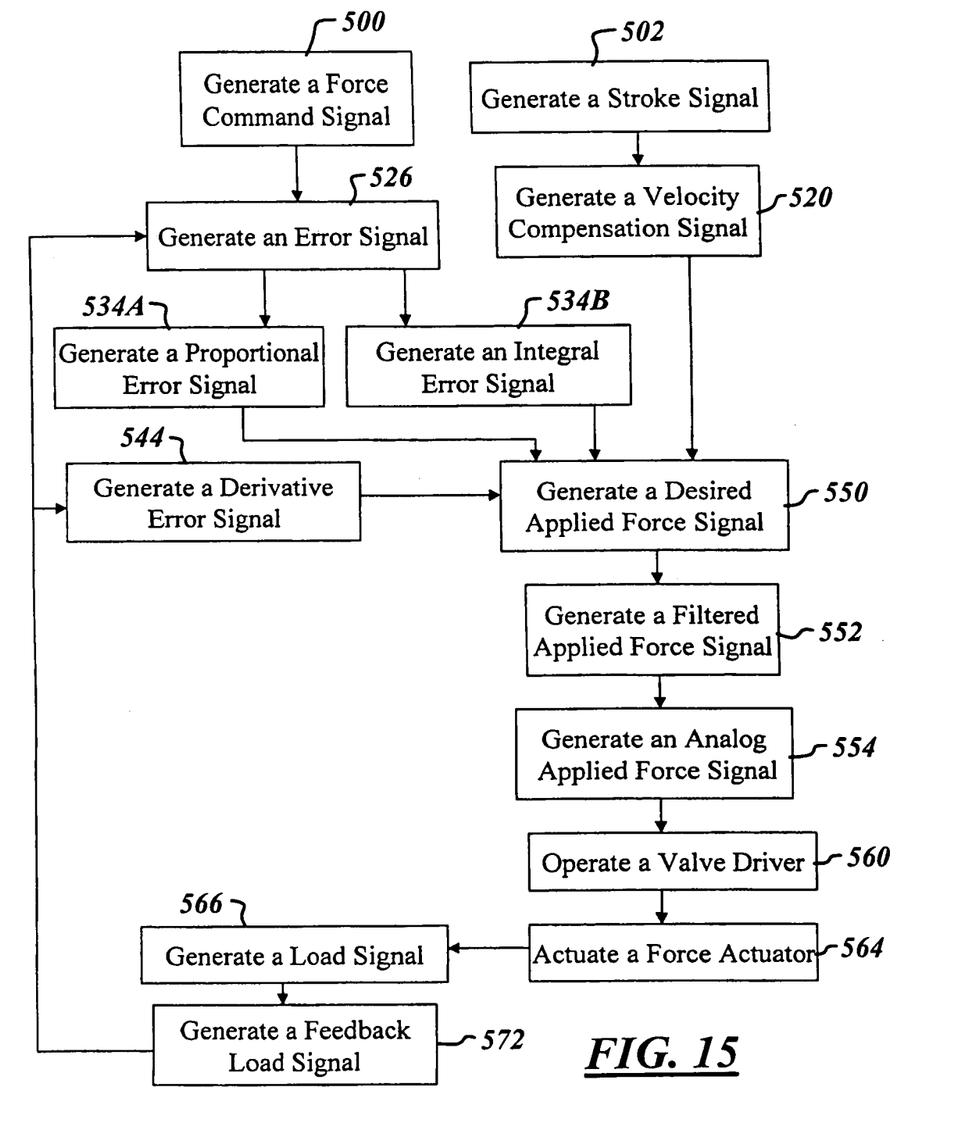
FIG. 15 is a logic control diagram illustrating another method of operating a force control system in accordance with an embodiment of the present invention.

Referring now to FIGS. 14 and 15, a block diagrammatic view of a force control system 480 and a logic control diagram illustrating a method of operating the force control system 480 and/or of applying a force on a test object are shown in accordance with yet another embodiment of the present invention. The force control system 480 includes a controller 482 that performs as a function generator. The controller 482 provides feedforward, as opposed to feedback, velocity compensation to one or more force actuators 484 (only one is shown).

In step 500, the controller 482 generates a load or force command signal 501, similar to the force command signal 314.

In step 502, the controller 482 also generates a displacement or stroke signal 503. The controller 482 provides velocity information to each force actuator 484. This eliminates the need for large load errors to drive the actuators. The controller 482 generates the stroke signal 503 such that the actuators are stroked in phase with the motion of the test object. The stroke signal 503 may be used to allow the actuators that are operating in a "follow" mode to displace in phase with the test object without introducing forces on the test object. When multiple actuators are used, the stroke signal 503 is typically not a function of the force command signal 501.

The force command signal 501 and the stroke command signal 503 are stored in the signal generator 482 or elsewhere. The stroke command signal provides the predicted or estimated stroke that the actuator is to perform in order to follow in phase with the motion of the test object. The stroke command signal is known from a previous understanding of one or more of the following: the load command signal; the dynamics of the force and position actuators; and the system components and the performance thereof.

Figure 16:
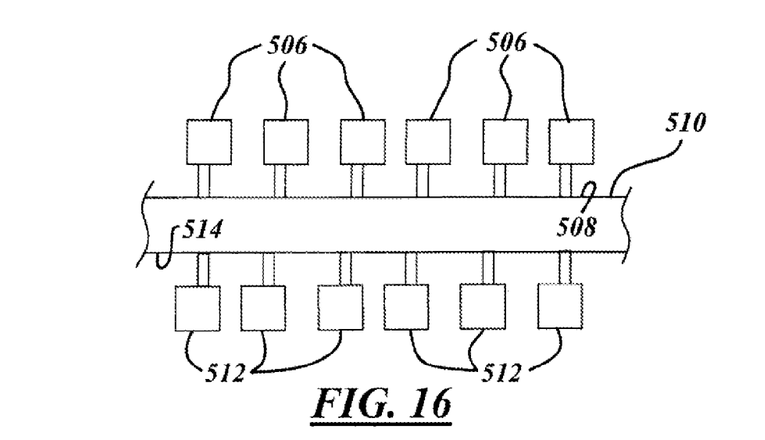
FIG. 16 is a side view of a wing having associated force applying actuators and following actuators performing in accordance with an embodiment of the present invention.

Referring also to FIG. 16, and as an example, during a wing test, a first set of force actuators 506 may be coupled to a topside 508 of a wing 510. A second set of force actuators 512 may be coupled to a bottom side 514 of the wing 510. The upper actuators 506 may apply force to flex the wing 510 upward and the lower actuators 512 may apply loads to flex the wing 510 downward. The actuators that are not applying a force or that are opposing the wing motion travel along or follow the motion of the wing without loading the wing. In using a stroke signal that is separate from the force command signal, the system 480 is able to stroke the following actuators when the associated force command signal is zero. This overcomes phase lag between the test object and the force actuator.

In step 520, a feedforward compensation circuit 522, which is coupled to an output of the controller 482, differentiates the stroke signal 503 to achieve a velocity compensation signal 524.

In step 526, the force command signal 501 and a feedback load signal 528 are summed via a seventh summing junction 530 to form an error signal 532.

In step 534, the error signal 532 is separately gain adjusted via a proportional compensation circuit 536 and an integral compensation circuit 538 to generate a proportional error signal 540 and an integral error signal 542, as represented by steps 534A and 534B. The proportional circuit 536 and the integral circuit 538 are coupled to the controller 482 via the summing junction 530.

In step 544, the feedback load signal 528 is gain adjusted via a derivative compensation circuit 546 to generate a derivative load signal 548.

In step 550, the velocity compensation signal 524, the proportional error signal 540, the integral error signal 542, and the derivative load signal 548 are summed using a eighth summing junction 544 to generate a desired applied force signal 546. In step 552, the desired applied force signal 546 is filtered using a forward loop filter 553 to generate a filtered applied force signal 555. In step 554, the filtered applied force signal 555 is converted to an analog applied force signal 556 using a D/A converter 558.

In step 560, the valve driver 562 operates in response to the analog applied force signal 556. In step 564, the force actuator 484 moves in response to the fluid pressures received from the valve driver 562.

In step 566, a load sensor 568 generates a load signal 570 in response to the load on a test device as applied by the force actuator 484.

In step 572, the load signal 570 is conditioned and converted into a digital format using a signal conditioner 574 having an A/D converter.

Steps 500-574 are continuously performed until the end of a test procedure. The above-described steps are also meant to be illustrative examples; the steps may be performed sequentially, synchronously, simultaneously, or in a different order depending upon the application.

The above steps may be performed after the running of the system 480 without the use of the velocity compensation to determine the projected velocity. This projected velocity may be utilized to generate the velocity profile used or generated in step 500.

The above control adds an additional signal source, the function generator, to control the motion of the force actuators. This separate source provides piston velocity information to each hydraulic actuator, thus, eliminating the need for large load errors to drive the actuators as in traditional control systems.

The above-described systems and methods, to one skilled in the art, are capable of being adapted for various applications and systems including: aeronautical systems, land-based vehicle systems, or other applications or systems known in the art that require servicing of a vehicle. The above-described invention can also be varied without deviating from the true scope of the invention.

What is claimed is:

1. A controlled system for application of force on a test object comprising:
    at least one force actuator coupled to and applying a force on the test object;
    a velocity signal generator in a feedforward configuration relative to said at least one force actuator and generating a velocity signal predictive of the velocity of the test object; and
    a controller coupled to said at least one force actuator and said velocity signal generator and generating a desired applied force signal compensated by said velocity signal.

2. A system as in claim 1 wherein said controller generates a force command signal, said applied force signal generated in response to said force command signal.

3. A system as in claim 2 further comprising a load sensor coupled to the test object and generating a load signal indicative of said applied force, said applied force signal adjusted in response to said force command signal and said load signal.

4. A system as in claim 3 further comprising:
    a summer generating an error signal in response to said force command signal and said load signal; and
    a gain adjustment circuit generating gain adjusted signals in response to said error signal;
    said applied force signal adjusted in response to said gain adjusted signals.

5. A system as in claim 1 further comprising a load sensor coupled to the test object and generating a load signal indicative of said applied force, said applied force signal adjusted in response to said load signal.

6. A system as in claim 1 wherein said velocity signal generator is a function generator.

7. A system as in claim 1 further comprising a load sensor coupled to the test object and generating a load signal indicative of said applied force, said load sensor in a feedback configuration relative to said at least one force actuator and said applied force signal adjusted in response to said load signal.

8. A system as in claim 1 wherein in said function generator generates a displacement profile that is predictive of the test object motion.

9. A system as in claim 8 further comprising a feedforward device coupled to said at least one force actuator and said controller, said feedforward device adjusting said applied force in response to said displacement profile.

10. A system as in claim 8 wherein said velocity signal generator generates a load command signal and a stroke command signal, said desired applied force signal generated in response to said load command signal and said stroke signal.

11. A system as in claim 10 further comprising a feedforward compensation circuit generating a velocity compensation signal in response to said stroke command signal, said controller generating said applied force signal compensated by said velocity compensation signal.

12. A system as in claim 10 further comprising a feedforward compensation circuit differentiating said stroke command signal to generate a velocity compensation signal, said feedforward compensation circuit adjusting said applied force in response to said velocity compensation signal.

13. A system as in claim 1 wherein said velocity signal generator and said controller are one in the same.

14. A system as in claim 1 wherein said at least one force actuator comprises a hydraulic actuator that applies said force on the test object.

15. A system as in claim 1 further comprising a fluid control valve coupled to and actuating said at least one force actuator in response to said desired applied force signal.

16. A force control system for testing of an object comprising:
    at least one fluid valve driver;
    at least one fluid control valve coupled to said at least one fluid valve driver;
    at least one hydraulic actuator coupled to said at least one fluid control valve and the test object, said at least one hydraulic actuator applying a force on the test object;
    a velocity signal generator in a feedforward configuration relative to said at least one force actuator and generating a velocity signal predictive of the velocity of the test object; and
    a controller coupled to said at least one force actuator and said velocity signal generator and generating a desired applied force signal compensated by said velocity signal.

17. A force control system as in claim 16 wherein said at least one hydraulic actuator comprises a plurality of hydraulic actuators coupled to a plurality of sides of the test object, said plurality of actuators comprising:
    an active actuator coupled to a first side of the test object; and
    a nonactive actuator coupled to a second side of the test object;
    said non-active actuator following movement of the test object without applying force on the test object.

18. A force control system as in claim 16 wherein said at least one fluid control valve comprises:
    a first fluid control valve coupled to said at least one force actuator and adjusting applied force on the test object; and
    a second fluid control valve coupled to and adjusting position of the test object.

19. A force control system as in claim 16 further comprising a feedforward compensation circuit generating a velocity compensation signal, said controller generating said applied force signal compensated by said velocity compensation signal.

20. A method of applying a force on a test object comprising:
    applying a force on the test object;
    generating a velocity signal predictive of the velocity of the test object in response to said force and in a feedforward configuration relative to a desired applied force signal;
    generating an actual load signal indicative of an actual load on the test object;
    generating said desired applied force signal in response to said velocity signal and said load signal; and actuating the test object in response to said desired applied force signal.

21. A method as in claim 20 further comprising:
generating a load command signal;
generating a stroke command signal;
generating said velocity signal in a feedforward arrangement relative to said desired applied force signal and in response to said stroke command signal; and
generating said desired applied force signal in response to said actual load command signal and said velocity signal.

22. A method as in claim 20 further comprising:
generating a load command signal;
generating a stroke command signal;
generating an error signal in response to said load command signal;
generating a velocity compensation signal in response to said stroke command signal; and
generating said applied force signal in response to said error signal and said velocity compensation signal.

23. A method as in claim 20 further comprising following movement of the test object without applying force on the test object via at least one non-active actuator.

24. A method as in claim 20 further comprising:
generating a load command signal of zero; and
stroking at least one actuator that is operating in a follow mode in response to said load command signal.

25. A method as in claim 20 further comprising:
generating a load command signal;
generating a proportional error signal in response to said load command signal;
generating an integral error signal in response to said load command signal;
generating a derivative load signal in response to said load command signal; and
generating said applied force signal in response to said proportional error signal, said integral error signal, and said derivative load signal.

* * * * *